(12) United States Patent
Busch et al.

(10) Patent No.: US 8,416,790 B1
(45) Date of Patent: Apr. 9, 2013

(54) PROCESSING ETHERNET PACKETS ASSOCIATED WITH PACKET TUNNELS

(75) Inventors: Dackary Ronald Busch, Veradale, WA (US); Kevin Q Daines, Liberty Lake, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 787 days.

(21) Appl. No.: 11/671,418

(22) Filed: Feb. 5, 2007

(51) Int. Cl.
*H04L 12/28* (2006.01)

(52) U.S. Cl. .......................................... 370/401

(58) Field of Classification Search .................. None
See application file for complete search history.

(56) References Cited

U.S. PATENT DOCUMENTS

| | | | |
|---|---|---|---|
| 7,626,930 B2 | 12/2009 | Agmon et al. | |
| 7,724,745 B1* | 5/2010 | Elangovan et al. | 370/392 |
| 7,830,883 B1* | 11/2010 | Fromm et al. | 370/392 |
| 2002/0194367 A1* | 12/2002 | Nakamura et al. | 709/238 |
| 2003/0152075 A1 | 8/2003 | Hawthorne, III et al. | |
| 2004/0066780 A1* | 4/2004 | Shankar et al. | 370/389 |
| 2004/0205239 A1 | 10/2004 | Doshi et al. | |
| 2005/0238049 A1 | 10/2005 | Delregno | |
| 2005/0286541 A1* | 12/2005 | Bottorff et al. | 370/401 |
| 2006/0133298 A1* | 6/2006 | Ng et al. | 370/254 |
| 2006/0285501 A1 | 12/2006 | Damm | |
| 2007/0008972 A1 | 1/2007 | Sifnatsch et al. | |
| 2007/0014290 A1 | 1/2007 | Dec et al. | |
| 2007/0064597 A1 | 3/2007 | Bernick et al. | |
| 2007/0071015 A1 | 3/2007 | Wang et al. | |
| 2007/0076719 A1* | 4/2007 | Allan et al. | 370/392 |
| 2007/0086361 A1* | 4/2007 | Allan et al. | 370/254 |
| 2007/0086455 A1 | 4/2007 | Allan et al. | |
| 2007/0098006 A1* | 5/2007 | Parry et al. | 370/437 |
| 2007/0116045 A1 | 5/2007 | Mohan et al. | |
| 2007/0165657 A1* | 7/2007 | Smith et al. | 370/401 |
| 2007/0268817 A1 | 11/2007 | Smallegange et al. | |
| 2007/0280267 A1 | 12/2007 | Ould-Brahim | |
| 2008/0019385 A1* | 1/2008 | Sultan et al. | 370/401 |
| 2008/0107027 A1* | 5/2008 | Allan et al. | 370/235 |
| 2008/0112333 A1 | 5/2008 | Busch et al. | |
| 2008/0144644 A1 | 6/2008 | Allan et al. | |
| 2008/0159291 A1* | 7/2008 | Sultan et al. | 370/392 |

(Continued)

OTHER PUBLICATIONS

Witters, J., et al., Technology White Paper, "VPLS Technical Tutorial", Alcatel Telecommunications Review, 4th Quarter, 9 pages (2004).*

(Continued)

*Primary Examiner* — Timothy J Weidner
(74) *Attorney, Agent, or Firm* — Clements Bernard PLLC; Christopher L. Bernard; Lawrence A. Baratta, Jr.

(57) ABSTRACT

Packet switch operating methods and packet switches receive an Ethernet packet from an Ethernet provider network and create a plurality of duplicates of the received Ethernet packet. The methods and switches then modify the duplicates by assign a same service instance identifier and a different packet tunnel identifier to each of the duplicates and then forward the modified duplicates to packet tunnels associated with the packet tunnel identifiers. Other methods and packet switches receive an Ethernet packet including a service instance identifier from a packet tunnel and prevent the received Ethernet packet from being forwarded to another packet tunnel associated with the service instance identifier. Packet tunnel networks including Ethernet provider networks and edge bridges fully connected by packet tunnels. The edge bridges are configured to prevent packets received from one of the tunnels from being forwarded to other tunnels.

20 Claims, 10 Drawing Sheets

U.S. PATENT DOCUMENTS

| | | | |
|---|---|---|---|
| 2008/0159309 A1 | 7/2008 | Sultan et al. | |
| 2008/0170573 A1 | 7/2008 | Ould-Brahim | |
| 2008/0170583 A1 | 7/2008 | Sultan et al. | |
| 2008/0172497 A1* | 7/2008 | Mohan et al. | 709/249 |
| 2008/0212595 A1* | 9/2008 | Figueira et al. | 370/401 |
| 2008/0259959 A1 | 10/2008 | Zhai | |
| 2008/0279184 A1* | 11/2008 | He | 370/390 |
| 2008/0291914 A1* | 11/2008 | Bi | 370/390 |
| 2008/0310417 A1* | 12/2008 | Friskney et al. | 370/392 |
| 2009/0168783 A1 | 7/2009 | Mohan et al. | |
| 2010/0034118 A1 | 2/2010 | Saltsidis | |
| 2010/0226376 A1* | 9/2010 | Mohan et al. | 370/395.53 |
| 2010/0322254 A1* | 12/2010 | Takacs | 370/395.53 |
| 2011/0032936 A1* | 2/2011 | Ashwood-Smith et al. | 370/390 |

OTHER PUBLICATIONS

"Provider Backbone Transport of Carrier Ethernet Services", World Wide Packets, Inc., Rev. 1.0; © 2007, 12 pages (undated).

Witters, J., et al., Technology White Paper, "VPLS Technical Tutorial", *Alcatel Telecommunications Review*, 4$^{th}$ Quarter, 9 pages (2004).

Riverstone Networks Whitepapers, "MPLS/VPLS Evolution: A Riverstone Perspective", *Riverstone Networks*, © 2006, 11 pages (undated).

U.S. Appl. No. 11/671,408, filed Feb. 5, 2007; inventor Busch et al.
U.S. Appl. No. 11/671,415, filed Feb. 5, 2007; inventor Busch et al.

* cited by examiner

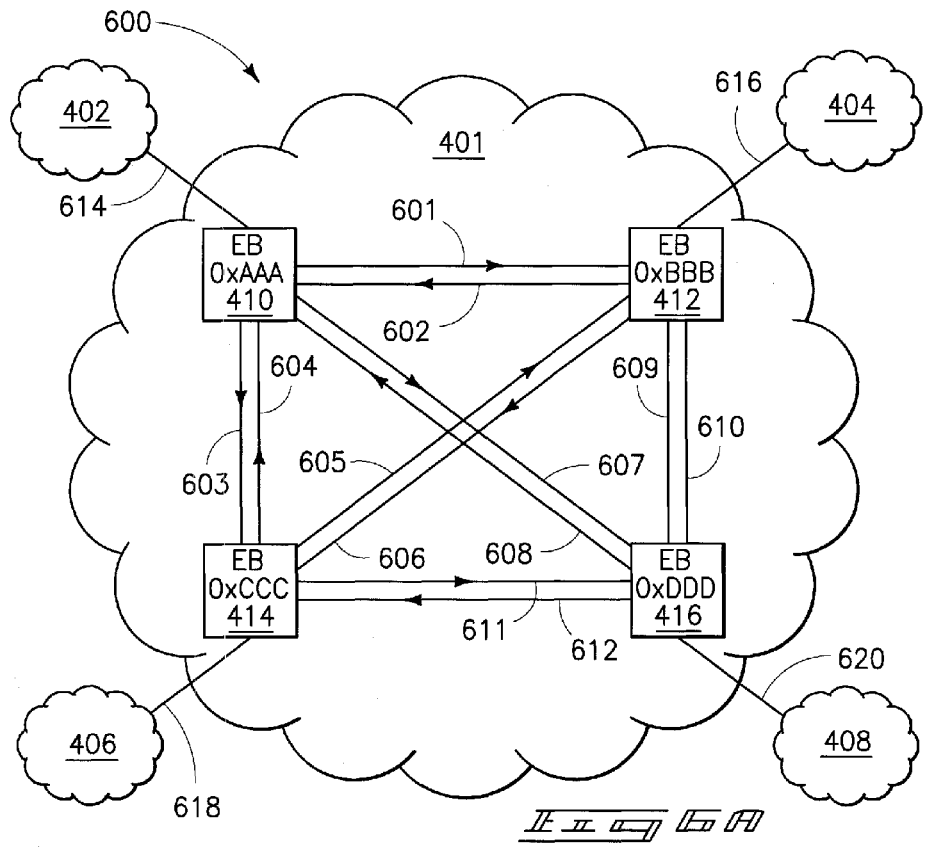
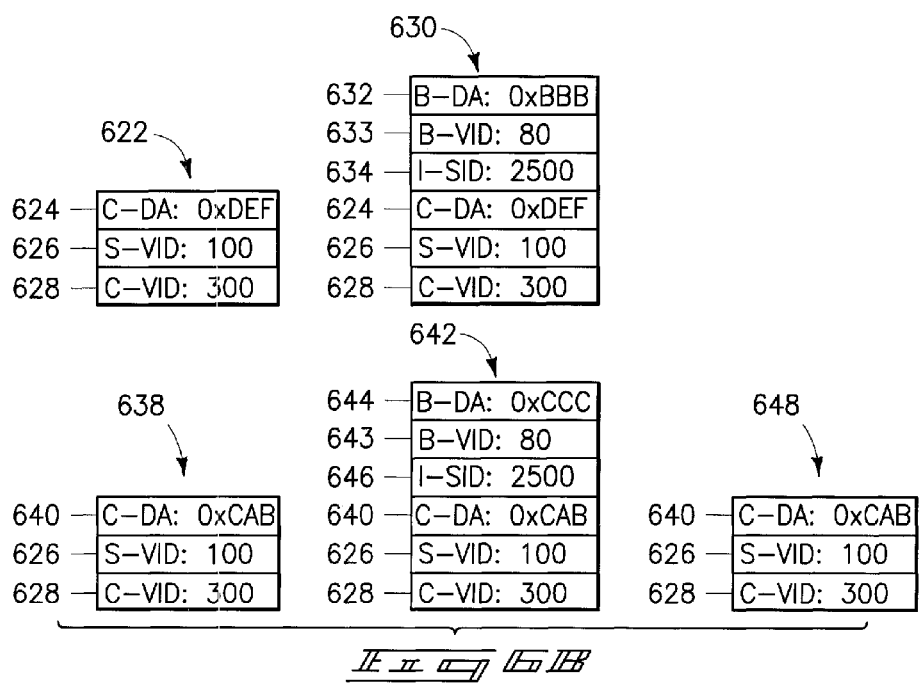

US 8,416,790 B1

PROCESSING ETHERNET PACKETS ASSOCIATED WITH PACKET TUNNELS

TECHNICAL FIELD

The present invention, in various embodiments, relates to methods and packet tunnel networks configured to process Ethernet packets associated with packet tunnels.

BACKGROUND OF THE INVENTION

Service providers utilize Ethernet provider networks to offer services such as virtual private networks (VPNs) to their customers. To support VPNs, the Ethernet provider networks may use Virtual Local Area Networks (VLANs) to identify traffic associated with one customer's VPN from traffic associated with another customer's VPN.

VLANs provide an effective mechanism for traffic identification. However, the number of VLANs that a service provider may support on a single Ethernet provider network may be limited by the length (in bits) of a standard VLAN identifier, which is included in packets relayed by the Ethernet provider network. A longer VLAN identifier could enable service providers to support additional VLANs on a single Ethernet provider network. However, using a longer VLAN identifier would be incompatible with existing Ethernet devices. Accordingly, Ethernet provider networks may be limited in the number of VLANs that they simultaneously support.

In addition to the VLAN limitation described above, Ethernet provider networks are limited in the number of customer devices they support. For each customer device that sends packets relayed by the Ethernet provider network, the Ethernet provider network may learn one to hundreds or thousands of Ethernet Medium Access Control (MAC) addresses. Switches making up the Ethernet provider network store these learned MAC addresses. Since these switches have a limited amount of memory, the Ethernet provider network may accommodate a limited number of customer devices.

The use of VPNs facilitated by Ethernet provider networks is increasing. However, the size of Ethernet provider networks may be restricted by the VLAN limitations and customer device limitations described above.

BRIEF DESCRIPTION OF THE DRAWINGS

Preferred embodiments of the invention are described below with reference to the following accompanying drawings.

FIG. 6*a* illustrates a logical representation of a system comprising another packet tunnel network enabling communication between four provider networks.

FIG. 6*b* illustrates a plurality of packet formats used within the system of FIG. 6*a*.

DETAILED DESCRIPTION OF THE PREFERRED EMBODIMENTS

Figure 1:
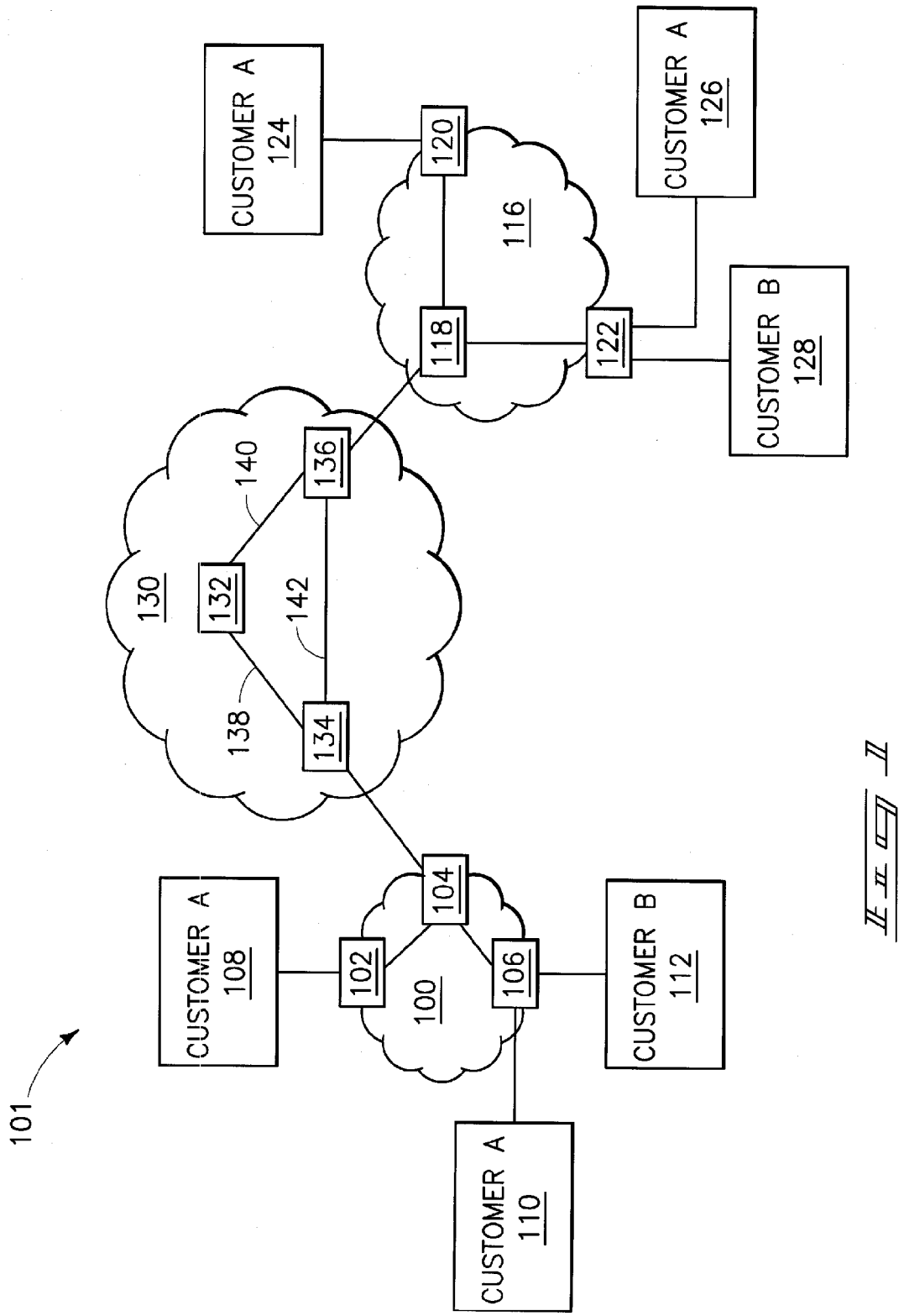
FIG. 1 illustrates a logical representation of a system comprising a backbone network enabling communication between two provider networks.

FIG. 1 illustrates a logical representation of a system 101 comprising a backbone network 130 enabling communication between two Ethernet provider networks 100 and 116. Provider network 100 includes provider bridges 102, 104, and 106 that provide layer-two Ethernet connectivity between site 108 and site 110, both of which are associated with customer A. Provider network 100 may provide service in a limited geographic area. For example, provider network 100 may be limited to a portion of a city.

Similarly, provider network 116 includes provider bridges 118, 120, and 122 that provide layer-two Ethernet connectivity between site 124 and site 126, both of which are associated with customer A. Like provider network 100, provider network 116 may also be limited to a specific geographic area.

Site 112, connected to provider network 100, and site 128, connected to provider network 116, are both associated with customer B. Since these sites are connected to different provider networks, connectivity between the provider networks allows site 112 to have connectivity to site 128.

Backbone network 130 provides layer-two Ethernet connectivity between provider network 100 and provider network 116 via three backbone bridges 132, 134, and 136. This layer-two Ethernet connectivity allows site 112 to exchange Ethernet packets with site 128 and sites 108 and 110 to exchange Ethernet packets with sites 124 and 126.

The layer-two Ethernet connectivity provided by backbone network 130 may be transparent to customer A and customer B. In other words, customer A might not be able to detect that provider networks 100 and 116 and backbone network 130 are involved in relaying Ethernet packets from site 108 to site 124 because, from customer A's perspective, packets transmitted by site 108 arrive at site 124 apparently unaltered. Customers find this transparency highly desirable because it enables them to exchange Ethernet packets between geographically disparate locations without having to make or maintain complicated equipment configurations.

Backbone bridges 132, 134, and 136 of provider network 130 relay Ethernet packets between provider network 100 and provider network 116. In order to distinguish Ethernet packets associated with customer A from Ethernet packets associated with customer B, backbone bridges 134 and 136 may add additional fields to Ethernet packets they receive from provider networks 100 and 116. These additional fields may also reduce the complexity of backbone network 130 by reducing the number of MAC addresses that backbone bridge 132 learns while forwarding packets between backbone bridge 134 and backbone bridge 136.

Links 138, 140, and 142 connect backbone bridges 132, 134, and 136 to each other. As illustrated, links 138, 140, and 142 form a loop. Since backbone bridges 132, 134, and 136 are Ethernet bridges, the loop formed by links 138, 140, and 142 may allow broadcast storms. However, backbone bridges 132, 134, and 136 may implement a scheme to prevent broadcast storms. For example, the backbone bridges may implement the spanning tree protocol defined by the Institute of Electrical and Electronics Engineers (IEEE) 802.1D standard, the Rapid Spanning Tree Protocol of IEEE 802.1 D, or the Multiple Spanning Tree Protocol (MSTP) of IEEE 802.1Q.

The use of such protocols in preventing broadcast storms is well known to those of skill in the art. However, these protocols may have fault detection and failover times that are unacceptable to some service providers operating backbone networks. In addition, backbone networks often include a large number of backbone bridges that may be physically separated by long distances. These factors may extend typical failover times. Consequently, backbone networks that rely on spanning tree protocols for broadcast storm prevention may be undesirable to some service providers.

Figure 2:
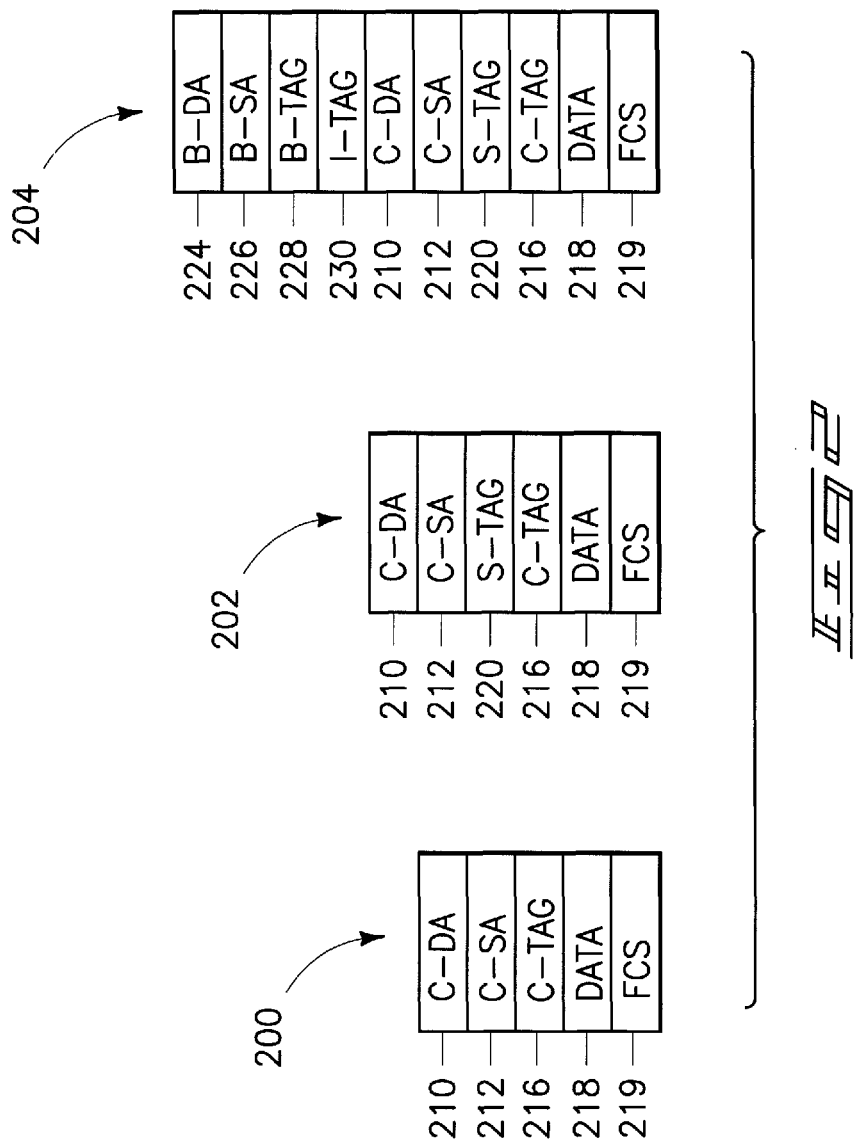
FIG. 2 illustrates a plurality of packet formats used by the networks of FIG. 1.

FIG. 2 illustrates three exemplary Ethernet packet formats 200, 202, and 204 that may be used by system 101. Each of the illustrated packet formats is representative of a packet format transmitted and/or received by the devices of system 101. The field at the top of the packet format represents a field at the front of the Ethernet packet and the field at the bottom of the packet format represents the field that is at the end of the packet. Of course, these packet formats may include additional fields, which are not illustrated.

Packet format 200 includes a customer destination address (C-DA) 210, a customer source address (C-SA) 212, a customer Tag (C-Tag) 216, data 218, and a frame check sequence (FCS) 219. C-DA 210 and C-SA 212 are layer-two MAC addresses. The C-Tag 216 includes a customer tag EtherType value, a customer VLAN identifier (C-VID), and other fields. This packet format may comply with the IEEE 802.1Q standard. Customer sites 108, 110, 112, 124, 126, and 128 may use packet format 200.

Packet format 202 may be used by provider bridges 102, 104, 106, 118, 120, and 122. Upon receiving a packet from a customer site, the provider bridges may modify the packet (which is in packet format 200) to conform to packet format 202. Packet format 202 includes a service tag field (S-Tag) 220 in addition to the fields of packet format 200. The S-Tag 220 may be inserted between C-SA 212 and C-Tag 216 and includes a service tag EtherType value (Service EType) field, a service VLAN identifier (S-VID), and other fields.

The Service EType may contain a value that describes the format of the fields that follow Service EType in packet 202. The S-VID may enable provider networks 100 and 116 to distinguish packets associated with different customers by assigning packets associated with each customer a different S-VID value.

Packet format 202 may be compliant with more than one standard or convention. For example, packet format 202 may be compliant with the IEEE 802.1 ad standard if the Service EType has a value of 0x88A8. Alternatively, the Service EType may have a value of 0x8100 or 0x9100, each of which are associated with conventions adopted by some service providers.

Packet format 204 may be used by the backbone bridges. Upon receiving a packet from provider network 100 or 116 (having format 202), backbone bridge 134 or 136 may modify the packet to conform to packet format 204. Packet format 204 includes the fields of packet format 202 and additionally includes a backbone destination address (B-DA) 224, a backbone source address (B-SA) 226, a backbone tag (B-Tag) 228, and an instance tag (I-Tag) 230. The I-Tag may include an instance service identifier (I-SID) that may be a twenty-four bit value. Packet format 204 may be compliant with the IEEE 802.1ah standard.

Figure 3:
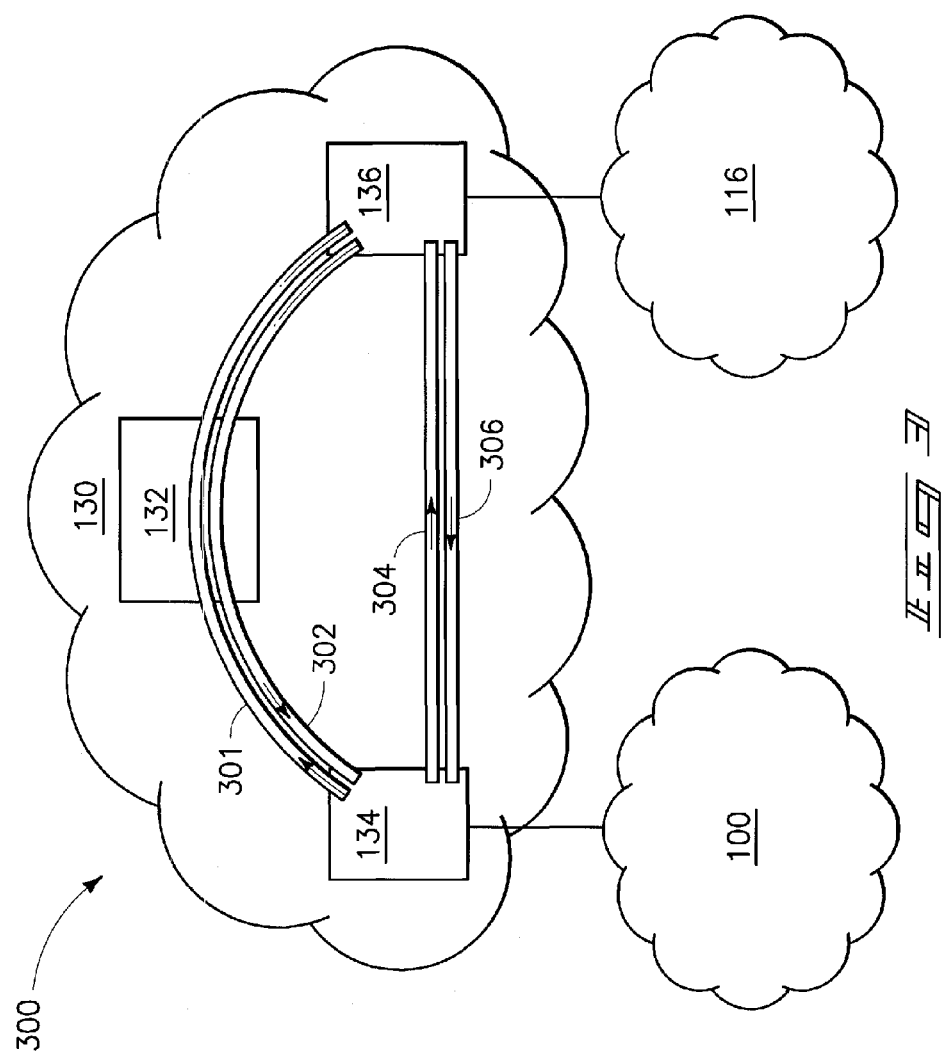
FIG. 3 illustrates a logical representation of another system comprising a backbone network enabling communication between two provider networks.

FIG. 3 illustrates a logical representation of a system 300 for providing connectivity between two provider networks. The system includes backbone network 130 and provider networks 100 and 116 of FIG. 1. Backbone network 130 includes backbone bridges 132, 134, and 136.

In system 300, backbone bridges 132, 134, and 136 do not forward Ethernet packets in a conventional manner as discussed above. Instead, system 300 uses packet tunnels 301 and 302 to exchange Ethernet packets between provider network 100 and provider network 116.

Packet tunnel 301 relays packets in one direction from backbone bridge 134 to backbone bridge 136 and packet tunnel 302 relays packets in the opposite direction from backbone bridge 136 to backbone bridge 134. Backbone bridge 132 relays packets associated with packet tunnels 301 and 302, but does not remove packets from the packet tunnels or insert packets into the packet tunnels.

Two additional packet tunnels are also illustrated, packet tunnel 304 and packet tunnel 306. These packet tunnels are backup packet tunnels. Backup packet tunnel 304 is associated with packet tunnel 301 and backup packet tunnel 306 is associated with packet tunnel 302. Typically, backup packet tunnels 304 and 306 are inactive. However, backup packet tunnels 304 and 306 may become active if the backbone bridges detect a problem with either packet tunnel 301 or 302.

If a problem is detected, primary packet tunnels 301 and 302 may be disabled and backup packet tunnels 304 and 306 may be enabled. Accordingly, packet tunnels 301 and 304 might not be simultaneously enabled. Similarly, packet tunnels 302 and 306 might not be simultaneously enabled.

Backbone bridges 134 and 136 need not implement loop detection and prevention protocols such as the spanning tree protocol discussed above in relation to FIG. 1 when backbone bridges 134 and 136 allow only one of the primary tunnel or the backup tunnel to be active at a time. This precludes loops and advantageously prevents broadcast storms.

Consequently, failover due to a broken link or other problem may be faster using packet tunnels than with a spanning tree protocol since each backbone bridge may detect when a tunnel associated with the backbone bridge is inactive and switch over to a backup tunnel without having to wait for propagation of spanning tree messages.

A limitation imposed by some backbone bridges is packets having a particular S-VID value might always be mapped to the same packet tunnel and to no other packet tunnel. This limitation may be overcome by forming a packet tunnel network.

According to one aspect of the invention, a packet tunnel network includes three or more Ethernet provider networks. Each of the Ethernet provider networks includes an S-VLAN. These S-VLANs are associated with a same packet tunnel service instance.

The packet tunnel network also includes three or more Edge Bridges (EBs). Each of the EBs is connected to a different one of the Ethernet provider networks. The EBs are configured to receive packets associated with the same packet tunnel service instance from their connected Ethernet provider networks and then select, on a per-packet basis, a destination EB for the received packets from among the other EBs.

In addition, the packet tunnel network includes a set of packet tunnels. The packet tunnels fully connect the EBs together. Each packet tunnel has only two endpoints. Each EB is configured to forward packets received from the Ethernet provider networks to their destination EBs via the packet tunnel connecting the EB to the destination EB.

The packet tunnel network advantageously enables multi-point communication between the Ethernet provider networks associated with a same service instance using packet tunnels having only two endpoints.

The packet tunnel network may also include a set of backup packet tunnels that fully connect the EBs. Like the packet tunnels, each of the backup tunnels may have only two endpoints. Each EB may be configured to forward packets received from its connected Ethernet provider network to their destination EBs via the backup packet tunnel connecting the EB to the destination EB if the packet tunnel connecting the EB to the destination EB is out of service.

The S-VLANs of the Ethernet provider networks may have a same S-VID value. However, the S-VLANs of the provider networks need not have the same S-VID value. In fact, at least one of the S-VLANs of the Ethernet provider networks may have an S-VID value that is different than the S-VID values of the other S-VLANs.

At least one of the Ethernet provider networks may be a provider bridging network operating according to the IEEE 802.1ad standard and utilizing packet format 202 described above in relation to FIG. 2. Of course, the Ethernet provider networks may conform to other standards or conventions. For example, the Ethernet provider networks may use packet format 202 and an Service EType having a value of 0x9100 or 0x8100.

Packets relayed by at least one of the Ethernet provider networks to its connected EB may include at least two VLAN identifier fields. One of the VLAN identifier fields may identify the S-VLAN included in the at least one Ethernet provider network. The two VLAN identifier fields may be the S-VID and the C-VID of exemplary packet format 202 described above in relation to FIG. 2.

Alternatively, packets relayed by one or more of the Ethernet provider networks to their connected EBs may include only one VLAN identifier field. In this case, the VLAN identifier field identifies an S-VLAN of at least one of the Ethernet provider networks. For example, the EBs may receive packets conforming to packet format 200 described above in relation to FIG. 2.

Each EB may be configured to select the destination EB based on an Ethernet C-DA included in packets received from the Ethernet provider networks. The length of the C-DA and the location of the C-DA within the packets may be specified by the IEEE 802.1 ad standard.

The packet tunnels may be configured to relay packets from one EB to another EB without altering the packets and may be connection oriented. Each packet tunnel may relay packets in only one direction. Furthermore, packets relayed by the packet tunnels that are associated with the same packet tunnel service instance may be marked with a same I-SID.

The number of the packet tunnels used to fully connect the EBs may be equal to the quantity of the EBs multiplied by the difference between the quantity of the EBs and one. In other words, the number of packet tunnels may be equal to $n \cdot (n-1)$ where n is the number of EBs.

Figure 4:
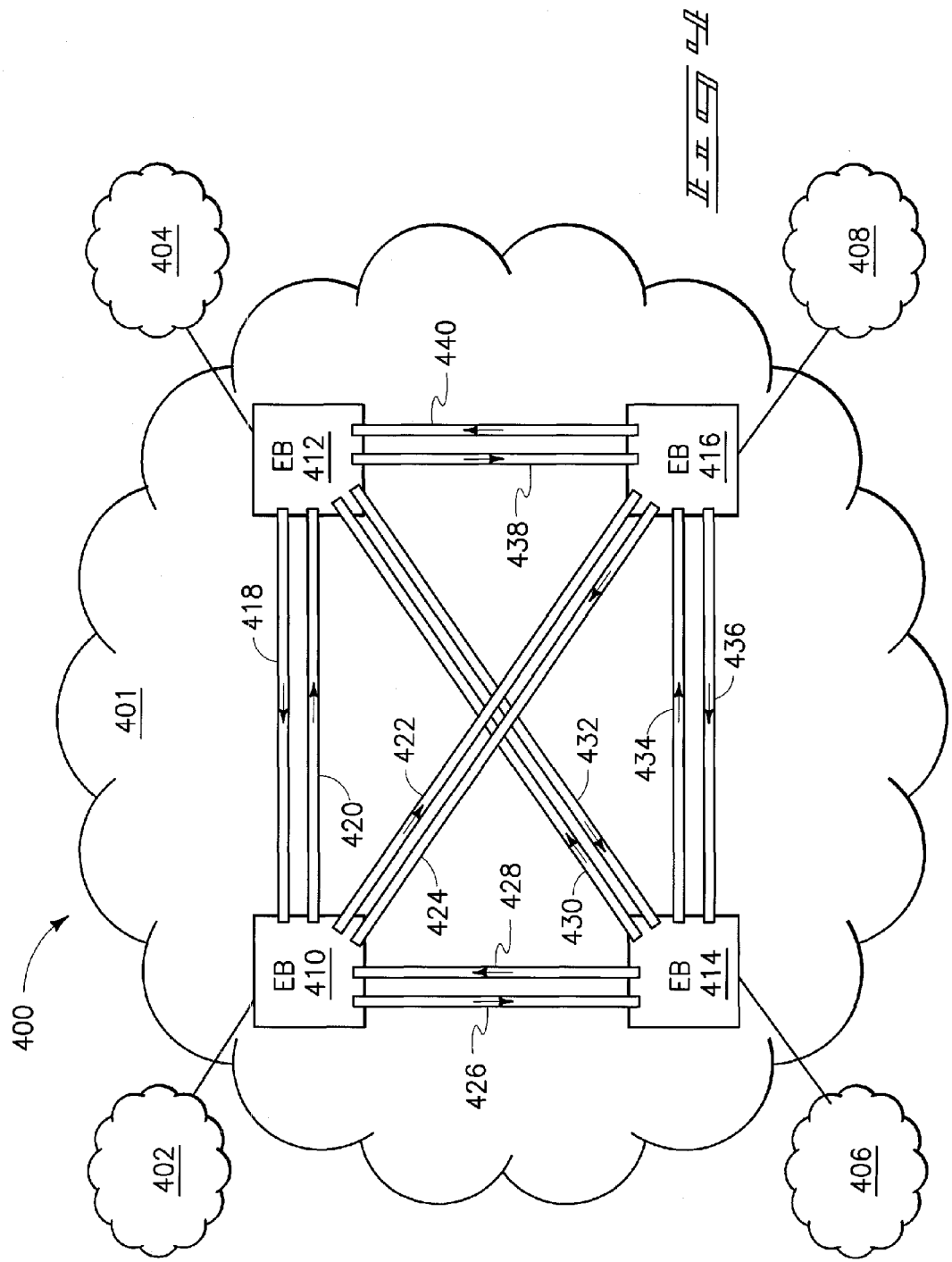
FIG. 4 illustrates a logical representation of a system comprising a packet tunnel network enabling communication between four provider networks.

FIG. 4 illustrates one example of a packet tunnel network within exemplary system 400. System 400 includes a packet tunnel network that enables communication between four provider networks. System 400 includes a backbone network 401 connecting provider networks 402, 404, 406, and 408 to each other. Provider network 401 includes EBs 410, 412, 414, and 416 which are fully connected to each other via packet tunnels 418, 420, 422, 424, 426, 428, 430, 432, 434, 436, 438, and 440. In other words, each EB is connected to each of the other EBs.

The packet tunnel network of FIG. 4 includes four EBs. However, it is to be understood that packet tunnel networks may include as few as three EBs. Four EBs are depicted in FIG. 4 to illustrate a relationship between the number of packet tunnels used to fully connect EBs in a packet tunnel network. This relationship may have been less apparent had the packet tunnel network of FIG. 4 included only three EBs.

As indicated in FIG. 4, the packet tunnels are unidirectional. For example, packet tunnel 418 relays packets in a single direction from EB 412 to EB 410. Similarly, packet tunnel 420 relays packets in one direction from EB 410 to EB 412. Of course, the packet tunnel network could also include backup packet tunnels, which for simplicity are not illustrated.

EBs 410, 412, 414, and 416 are configured to receive packets from provider networks 402, 404, 406, and 408 respectively and relay the packets to one of the other provider networks. For example, EB 410 is configured to receive packets from provider network 402.

Upon receiving a packet from provider network 402, EB 410 selects a destination EB for the received packet from among EBs 412, 414, and 416. Once EB 410 has selected a destination EB, EB 410 forwards the packet to the destination EB via the packet tunnel connecting EB 410 to the destination EB. Upon receiving the packet, the destination EB may then forward the packet to its connected provider network.

For example, if EB 410 receives a packet from provider network 402 that is addressed to a device within provider network 404, EB 410 forwards the packet to EB 412 via packet tunnel 420. EB 412 may subsequently forward the packet to provider network 404.

In this manner, backbone network 401 enables multi-point connectivity between provider networks 402, 404, 406, and 408 by enabling each of the four provider networks to send packets to any of the other provider networks. For example, the multi-point connectivity may enable a layer-two VPN between provider networks 402 and 408. The VPN may facilitate packet exchange between an S-VLAN in provider network 402 and an S-VLAN in provider network 408. As mentioned above, an S-VID associated with the S-VLAN of provider network 402 may have the same value as an S-VID associated with the S-VLAN of provider network 408. Alternatively, the two S-VIDs may have different values.

System 400 may also be used to provide multi-point connectivity between a plurality of backbone networks. For example, networks 402, 404, 406, and 408 may each be backbone networks comprising their own packet tunnel networks. In this case, backbone network 401 may provide connectivity between the four backbone networks resulting in a hierarchical backbone network.

Returning now to the description of the first aspect of the invention, the packet tunnel network may also include one or more Core Bridges (CBs). The CBs connect two or more of the EBs together and facilitate at least one of the packet tunnels. The CBs facilitate at least one of the packet tunnels by receiving packets associated with the packet tunnel on a first port of the CB and relaying the packets received on the first port only to a second port of the CB. The CBs do so without altering the packets. The first and second ports of the CB may both be associated with the packet tunnel facilitated by the CB.

The CB may forward the packets from the first port to the second port based on a static entry in a forwarding database. For example, the forwarding database may specify that a MAC address of the destination EB is associated with the second port. As packets are received on the tunnel, the packets may all include the destination EB's MAC address as a B-DA.

The CB may consult the forwarding database and learn that the packets are to be sent to the second port based on the static entry. The static entry may allow conventional MAC learning to be disabled for the CB. For example, learning may be disabled on the CB for tunnels that are relayed by the CB, but learning may remain enabled on the CB for packets that are not associated with a tunnel being relayed by the CB.

The CB might not be capable of reading or inspecting all of the fields of the packets it receives. For example, the CB might be a device capable of receiving and forwarding IEEE 802.1ad compliant packets. In this case, if the CB receives IEEE 802.1ah compliant packets, the CB may treat the B-DA, B-SA, and B-Tag fields of the IEEE 802.1ah compliant packet as if they were a C-DA, C-SA, and S-Tag respectively. The CB may treat the remaining fields of the IEEE 802.1ah compliant fields as being part of the data field.

This behavior is possible since the B-DA, B-SA, and B-Tag fields of an IEEE 802.1ah compliant packet advantageously have the same lengths, formats, and positions of the C-DA, C-SA, and S-Tag of an IEEE 802.1 ad compliant packet. Accordingly, backbone networks may use CBs that are less sophisticated than EBs since the CBs might not need to parse all of the fields of the IEEE 802.1ah packets that the CBs receive in order to make a forwarding decision for the received packets.

Furthermore, CBs might not need to modify received packets or learn MAC addresses of packets associated with tunnels. Accordingly, CBs may need very little configuration and may be less expensive than EBs, advantageously reducing the cost of backbone networks.

The simplicity of the CB may provide a distinct advantage over other packet tunnel based networks, such as Virtual Private LAN Services (VPLS) networks, which utilize intermediate devices that modify received packets and parse many of the fields of the received packets. These intermediate devices may require a significant amount of configuration.

In some packet tunnel networks, at least one of the EBs may be configured to terminate one of the packet tunnels and facilitate another of the packet tunnels. These EBs receive packets associated with a packet tunnel on a first port and relay the received packets only to a second port without altering the received packets.

Figure 5:
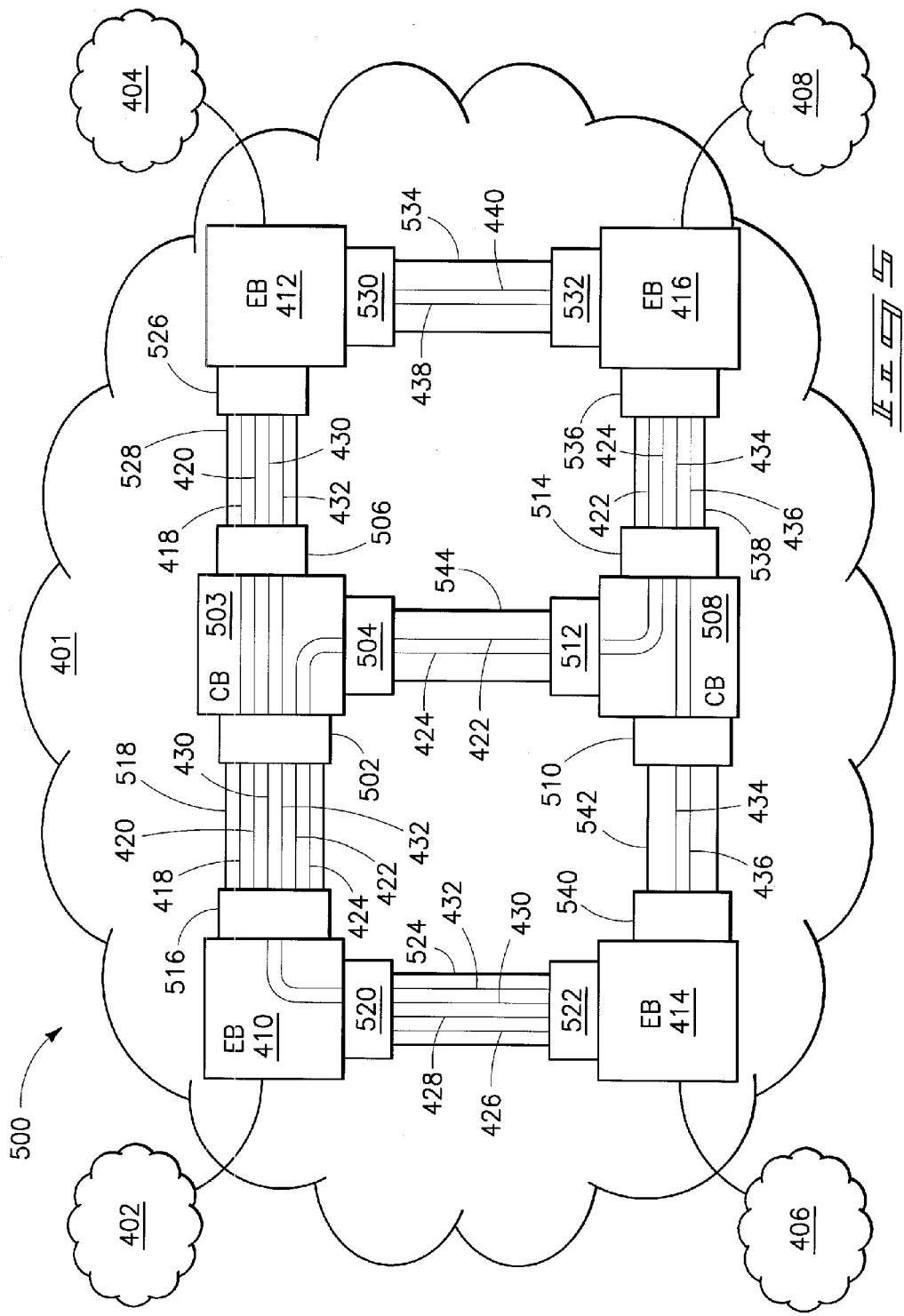
FIG. 5 illustrates a block diagram of the packet tunnel network of FIG. 4.

FIG. 5 illustrates a block diagram of the packet tunnel network of FIG. 4 that includes CBs in accordance with the CBs described above. Packet tunnels 418, 420, 422, 424, 426, 428, 430, 432, 434, 436, 438, and 440 described above in relation to FIG. 4 each connect two of EBs 410, 412, 414, and 416 together. However, EBs 410, 412, 414, and 416 might not all be directly connected to each other. Instead, CBs may physically connect the EBs together.

System 500 illustrates an exemplary configuration of EBs and CBs. System 500 includes provider networks 402, 404, 406, and 408 and EBs 410, 412, 414, and 416. System 500 also includes CBs 503 and 508.

Links 518, 524, 528, 534, 538, 542, and 544 connect EBs 410, 412, 414, 416 and CBs 503 and 508 together via ports 502, 504, 506, 510, 512, 516, 514, 520, 522, 526, 530, 532, 536, and 540. For example, EBs 410 and 414 are connected by link 524.

Each of links 518, 524, 528, 534, 538, 542, and 544 facilitate two or more of packet tunnels 418, 420, 422, 424, 426, 428, 430, 432, 434, 436, 438, and 440. For example, link 524 facilitates packet tunnels 426, 428, 430, and 432. Similarly, the other links also facilitate packet tunnels as indicated in FIG. 5.

CBs 503 and 508 do not terminate the packet tunnels, instead, CBs 503 and 508 relay the packet tunnels between the EBs. For example, CB 508 relays packet tunnels 436 and 434 from EB 414 to EB 416. Accordingly, packet tunnels 436 and 434 each have two endpoints, one at EB 414 and one at EB 416. There are no endpoints of packet tunnels 436 or 434 at CB 508 since neither of these packet tunnels terminates at CB 508.

As was described above, EBs may terminate packet tunnels and may additionally relay packet tunnels. For example, EB 410 terminates packet tunnels 418, 420, 422, 424, 426, and 428 and relays packet tunnels 430 and 432.

As was mentioned above, the packet tunnels may be connection oriented, meaning each packet relayed by a particular packet tunnel follows the same path. For example, packets relayed by packet tunnel 430 travel from EB 414 on link 524 to EB 410 and then on link 518 to CB 503 and then on link 528 to EB 412. Even though there is physical connectivity between EB 414 and EB 412 via link 542, CB 508, link 538, EB 416, and link 534, packets associated with packet tunnel 430 are not relayed by this alternate path. Instead, packets associated with packet tunnel 430 follow a consistent path through EB 410 and CB 503 to EB 412.

According to another aspect of the invention, a packet switch receives an Ethernet packet that includes a C-DA. The packet switch then selects one of a plurality of packet tunnel identifiers. The selection of the packet tunnel identifier is based at least on the C-DA. Each of the plurality of packet tunnel identifiers is associated with a different one of a plurality of packet tunnels. The packet tunnels terminate on the packet switch.

The packet switch modifies the received Ethernet packet by adding the selected packet tunnel identifier to the received Ethernet packet and then forwards the modified packet to the packet tunnel associated with the selected packet tunnel identifier. The received Ethernet packet may include an S-VID. In this case, the packet switch may additionally base its selection of one of the packet tunnel identifiers on the S-VID.

The packet switch advantageously enables multipoint communication by selecting a packet tunnel identifier based on the C-DA, providing greater flexibility than conventional tunnels described above that may select a packet tunnel identifier based only on the S-VID. Accordingly, packets having a same S-VID value but different C-DA values may be forwarded to different packet tunnels.

In addition, the packet switch may select one of a plurality of I-SIDs based on the S-VID of the received Ethernet packet. Each of the I-SIDS may be associated with two or more of the packet tunnels. The packet switch may modify the received Ethernet packet by adding the selected I-SID to the received Ethernet packet.

The received Ethernet packet may comply with one or more standards. For example, a length and a location of the C-DA within the received Ethernet packet may comply with the IEEE 802.1 ad standard and a length and a location of the C-DA within the modified packet may comply with the IEEE 802.1ah standard. Furthermore, a length and a location of the S-VID within the received Ethernet packet may comply with the IEEE 802.1 ad standard and a length and a location of the S-VID within the modified packet may comply with the IEEE 802.1ah standard.

In addition, a length in a location of the I-SID within the modified Ethernet packet may comply with the IEEE 802.1 ah standard. The packet tunnel identifiers may include a B-DA and a B-VID in accordance with the IEEE 802.1ah standard.

Each of the packet tunnels might have only two endpoints and each of the packet tunnels may be configured to relay Ethernet packets from one of the endpoints to the other endpoint in the connection-oriented manner without altering the Ethernet packets. Furthermore, the packet tunnels may be configured to relay packets in only one direction. Alternatively, the packet tunnels may be bidirectional packet tunnels that relay packets in both directions.

FIG. 6a illustrates one example of a packet switch in an exemplary system 600. System 600 includes backbone network 401; provider networks 402, 404, 406, and 408; EBs 410, 412, 414, and 416; and packet tunnels 601, 602, 603, 604, 605, 606, 607, 608, 609, 610, 611, and 612 fully connecting EBs 410, 412, 414, and 416.

EBs 410, 412, 414, and 416 may each implement the packet switch operating method described above. EB 410 may receive an Ethernet packet that includes a C-DA from provider network 402. EB 410 then selects one of a plurality of packet tunnel identifiers based on the C-DA and modifies the received packet to have the selected packet tunnel identifier.

EB 410 then forwards the modified packet to the packet tunnel associated with the packet tunnel identifier for the received packet by searching for the MAC address specified by the C-DA of the received Ethernet packet in a forwarding database. The forwarding database may be maintained by EB 410 and may contain an association between MAC addresses and ports on which devices associated with the MAC addresses may be connected either directly or indirectly.

For example, the forwarding database may specify that a particular MAC address is associated with port one of EB 410. Based on this information, EB 410 may forward the received Ethernet packet to port one. A device connected to port one may then receive the forwarded Ethernet packet and make a similar forwarding decision. Eventually, the Ethernet packet will reach the device having the MAC address specified by the C-DA.

EB 410 may populate the forwarding database using conventional learning techniques well known to those of skill in the art, which may include storing the C-SA of each packet received by the EB 410 along with the port number on which the packet was received. In this manner, as EB 410 receives packets, EB 410 may record the MAC addresses specified by the received packets' C-SAs so that in the future when a packet is received by EB 410 with a C-DA specifying a MAC address that matches one of the stored MAC addresses, EB 410 may forward the packet to the port associated with the previously learned, matching MAC address.

Of course, the forwarding database may age stored MAC addresses out of the forwarding database according to techniques well known by those of skill in the art. Aging may ensure that the forwarding database is not consumed by MAC addresses to which packets are infrequently sent, ensuring efficient use of the forwarding database.

A packet received by EB 410 may include an S-VID and EB 410 may select an I-SID based on the S-VID by consulting a configuration, mapping, or other associative device. The configuration may specify an association between S-VID values and I-SID values wherein each of the S-VID values may be mapped to a single I-SID value and each I-SID value may be mapped to a single S-VID value.

Based on the mapping, EB 410 may modify the received Ethernet packet by adding the I-SID value corresponding to the S-VID value to the received Ethernet packet as well as the selected tunnel identifier.

For example, as illustrated in FIG. 6b, EB 410 may receive exemplary Ethernet packet 622 from provider network 402. Exemplary packet 622 includes, among other fields, a C-DA 624, an S-VID 626, and a C-VID 628. Exemplary Ethernet packet 622 may comply with the IEEE 802.1ad format described above in relation to packet format 202 of FIG. 2. EB 410 may consult the forwarding database and may find that C-DA 624, which has a value of 0xDEF, is present in the forwarding database and is associated with EB 412.

EB 410 may then modify the packet to include at least the fields illustrated by exemplary packet 630. Exemplary packet 630 includes a B-DA 632 with a value of 0xBBB, which is the MAC address of EB 412. The value 0xBBB is a hexadecimal address meant to represent the MAC address. Of course, an actual MAC address may include more than three hexadecimal digits, but three hexadecimal digits are illustrated here for simplicity.

EB 410 also adds a B-VID field 633 and an I-SID field 634 having a value of 2500 to the packet. The combination of B-DA 632 and B-VID 633 may be a packet tunnel identifier that is associated with packet tunnel 601. EB 410 may add additional fields and exemplary packet 630 may include additional fields beyond those depicted by FIG. 6b. EB 410 then sends the modified packet to packet tunnel 601 which relays the modified packet to EB 412.

EB 410 may receive packets from provider network 402 that have alternative formats. For example, EB 410 may receive a packet that includes an S-VID but does not include a C-VID. In this case, EB 410 may determine an I-SID for the packet based on the S-VID value.

Alternatively, a packet received by EB 410 may include a C-VID but no S-VID and EB 410 may select an I-SID based on the C-VID by consulting a configuration, mapping, or other associative device. The configuration may specify an association between C-VID values and I-SID values wherein each of the C-VID values may be mapped to a single I-SID value and each I-SID value may be mapped to a single C-VID value.

Furthermore, a packet received by EB 410 might not include either a C-VID or an S-VID. In this case, EB 410 may select an I-SID based on the C-DA by consulting a configuration, mapping, or other associative device. The configuration may specify an association between C-DA values and I-SID values wherein one or more of the C-DA values may be mapped to a single I-SID value.

According to another aspect of the invention, a packet switch may receive Ethernet packets from a first Ethernet network. The packets may include an S-VID having a same value. The packet switch forwards one of the received Ethernet packets to a second Ethernet network via a first packet tunnel and forwards another of the received Ethernet packets to a third Ethernet network via a second packet tunnel.

In addition, the packet switch may assign the received Ethernet packets to a same I-SID based on the S-VID and may add the same I-SID to the received Ethernet packets prior to forwarding the received Ethernet packets.

Furthermore, the packet switch may add a first tunnel identifier associated with the first packet tunnel to the one received Ethernet packet prior to forwarding the one received Ethernet packet to the second Ethernet network via the first packet tunnel. The packet switch may also add a second tunnel identifier associated with the second packet tunnel to other received Ethernet packet prior to forwarding the other received Ethernet packet to the third Ethernet network via the second packet tunnel. The first tunnel identifier and the second tunnel identifier may be different from each other.

Forwarding the one received Ethernet packet may include forwarding the one received Ethernet packet based on a first Ethernet C-DA. The first Ethernet C-DA may be associated with an Ethernet device within the second Ethernet network. Forwarding the other received Ethernet packet may include forwarding the other received Ethernet packet based on a second Ethernet C-DA. The second Ethernet C-DA may be associated with an Ethernet device within the third Ethernet network.

The received Ethernet packets may be received on a first port of the packet switch and the one of the received Ethernet packets may be forwarded on a second port of the packet switch. The other of the received Ethernet packets may be forwarded on a third port of the packet switch.

Alternatively, the received Ethernet packets may be received on a first port of the packet switch and the one of the received Ethernet packets may be forwarded on a second port of the packet switch along with the other of the received Ethernet packets.

For example, the one received Ethernet packet may be exemplary packet 622 forwarded by EB 410. The other received Ethernet packet may be a packet that EB 410 subsequently receives from provider network 402. Portions of the subsequently received packet are illustrated by exemplary packet 638.

Exemplary packet 638 has the same S-VID 626 and C-VID 628 values as exemplary packet 622. However, exemplary packet 638 has a different C-DA 640 value, which is 0xCAB. EB 410 may consult its forwarding table to determine which of EBs 412, 414, and 416 is associated with MAC address 0xCAB.

In this exemplary configuration, the forwarding table indicates that EB 414 is associated with MAC address 0xCAB. Since exemplary packet 638 includes an S-VID 626 having a value of 100, EB 410 consults its mapping and determines that exemplary packet 638 is associated with I-SID 2500 since packets having an S-VID 626 with a value of 100 are mapped to I-SID value 2500. Thus, EB 410 may map packets 622 and 638, which both have the same S-VID value, to different packet tunnels based on their different C-DA values.

Accordingly, EB 410 modifies exemplary packet 638 to include additional fields including B-DA 644 having a value of 0xCCC (the MAC address of EB 414), B-VID 643, and I-SID 646 having a value of 2500. EB 410 may then forward the modified packet to EB 414 via packet tunnel 603. EB 410 also determines the tunnel ID, which may be a combination of the B-DA 644 and the B-VID 643, and adds the tunnel ID to exemplary packet 638 to form exemplary packet 642. Note that exemplary packet 642 and exemplary packet 630 do not have the same tunnel identifier.

Since a tunnel identifier may be the combination of the B-DA and the B-VID, the fact that both exemplary packets have a B-VID 633 having a value of 80 does not mean that they both have the same tunnel ID since exemplary packets 630 and 642 have different B-DA values.

Packet tunnel 603 relays exemplary packet 642 to EB 414. Upon receiving exemplary packet 642, EB 414 may consult its configuration to determine if provider network 406 is associated with an S-VID value of 100. In this exemplary configuration, provider network 406 is associated with an S-VID having a value of 100. Accordingly, EB 414 removes the fields of exemplary packet 642 added by EB 410 before forwarding the packet to provider network 406. Exemplary packet 648 illustrates the modified packet sent from EB 414 to provider network 406.

In addition to learning MAC addresses from C-SA values of packets it receives, each EB may also learn which I-SID values are associated with each EB by inspecting packets as they are received from other EBs. Each EB may store an association between an I-SID value and the EB from which the packet was received so that each EB knows which of the other EBs are associated with a particular I-SID value.

This information may be advantageously used by the EB to provide different levels of service to packets belonging to a particular I-SID value. For example, each EB may have queues configured to give priority to packets having a particular I-SID value on each of the ports associated with EBs having that I-SID value.

Furthermore, the ability to learn I-SID values may reduce the amount of configuration a service provider performs in configuring a new service instance. For example, to provision a new service instance a service provider may add a new I-SID value/S-VID value mapping to two or more of the EBs involved in the service. Advantageously, the service provider need not change the configuration of EBs not involved in the service or CBs that relay the service since EBs not involved in the service will learn the new I-SID value and CBs that relay the service may perform their relay function based on the packet tunnel identifier, not on the I-SID value.

According to another aspect of the invention, a packet switch receives an Ethernet packet from an Ethernet provider network. The packet switch creates a plurality of duplicates of the received Ethernet packet and modifies the duplicate packets by adding a same I-SID and a different one of a plurality of packet tunnel identifiers to each of the duplicates. Each of the packet tunnel identifiers is associated with a different one of a plurality of packet tunnels originating on the packet switch. The packet switch forwards the modified duplicates to the packet tunnels associated with the packet tunnel identifiers within the modified duplicates.

The received Ethernet packet may include an Ethernet C-DA that is not present in a forwarding database of the packet switch. The C-DA may be an Ethernet broadcast destination address or may be an Ethernet multicast address. The modified duplicates may include an Ethernet B-DA that complies with the IEEE 802.1ah standard and is a unicast Ethernet destination address.

The quantity of the duplicates may be the same as the quantity of the plurality of packet tunnels that originate on the packet switch. Alternatively, the quantity of the plurality of duplicates may be less than the quantity of the plurality of packet tunnels originating on the packet switch.

Figure 7:
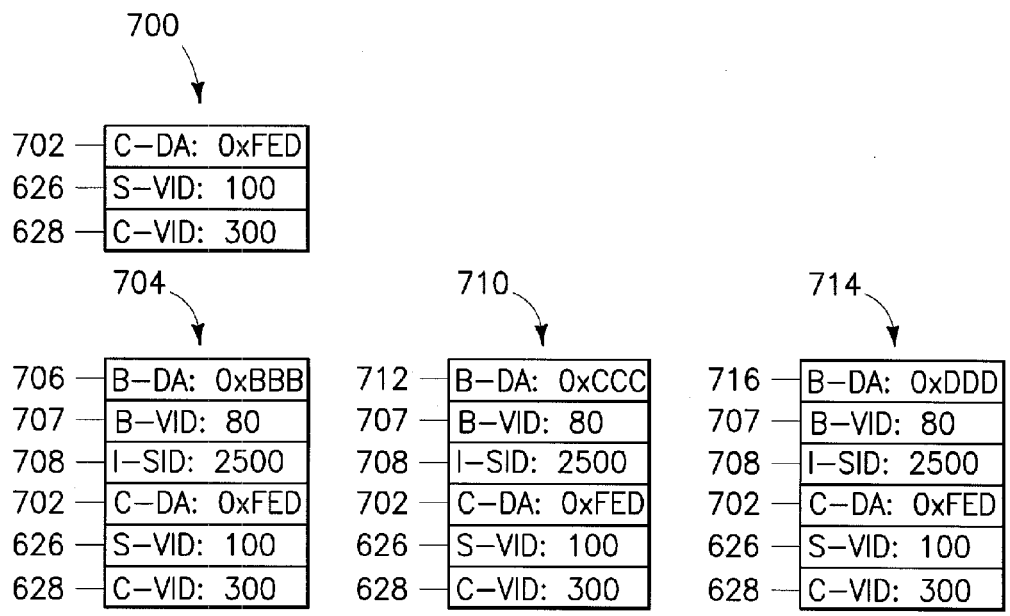
FIG. 7 illustrates additional packet formats used within the system of FIG. 6*a*.

FIG. 7 illustrates two exemplary packet formats associated with this aspect of the invention. The packet switch may be one of EBs 410, 412, 414, or 416 of FIG. 6a described above in relation to FIG. 6a. For example, EB 410 may receive an Ethernet packet from provider network 402.

Exemplary packet 700 illustrates the Ethernet packet received from provider network 402 and includes C-DA 702, S-VID 626, and C-VID 628. As with other exemplary packets describe herein, exemplary packets 700, 704, 710, and 714 may include additional fields not illustrated for simplicity. EB 410 may duplicate exemplary packet 700 and then modify the duplicates. EB 410 may create three duplicates since EB 410 is connected to three other EBs, namely EB 412, EB 414, and EB 416. Exemplary packets 704, 710, and 714 represent the modified duplicates.

EB 410 modifies the duplicates by adding a same I-SID 708 having a value of 2500 to each of the duplicates as illustrated by exemplary packets 704, 710, and 714. EB 410 also adds a packet tunnel identifier to each of the modified duplicates. Each of the packet tunnel identifiers may be different.

The modified duplicates may have the same B-VID 707. However, each of the duplicates may have a different B-DA value. The B-DA value may correspond with one of the other EBs. Exemplary packet 704 has a tunnel identifier including a B-DA 706 having a value of 0xBBB, which corresponds to the MAC address of EB 412, and B-VID 707. Exemplary packet 710 has a packet tunnel identifier comprising a B-DA 712 with a value of 0xCCC, which corresponds to the MAC address of EB 414, and B-VID 707. Exemplary packet 714 has a packet tunnel identifier comprising a B-DA 716 with a value of 0xDDD, which corresponds to the MAC address of EB 416, and B-VID 707.

Once EB 410 has modified the duplicates to have different packet tunnel identifiers and the same I-SID 708, EB 410 forwards each of the packets to a different packet tunnel. Here, exemplary packet 704 is forwarded to packet tunnel 601, which relays exemplary packet 704 to EB 412. Similarly, exemplary packet 710 is forwarded to EB 414 via a packet tunnel 603 and exemplary packet 714 is forwarded to EB 416 via packet tunnel 607.

EB 410 may forward a packet received from packet network 402 to each of the other three EBs in several situations. First, EB 410 may forward a received packet that has a C-DA that is a reserved Ethernet broadcast destination address. In this case, the received packet is intended to be broadcast to other devices that are part of the S-VLAN associated with provider network 402.

Since backbone network 401 is meant to emulate and extend the S-VLAN, it forwards the broadcast packet to each of the other EBs. Despite the C-DA broadcast address, the B-DA values of duplicated packets may be different unicast addresses rather than the reserved broadcast address. Since EB 410 knows each of the EBs to which it is connected, EB 410 may address each duplicate with the MAC address of the destination EB rather than using the broadcast address.

Alternatively, EB 410 may be configured to place the reserved Ethernet broadcast address in the B-DA field of the modified duplicates. However, this may require that CBs intermediate to the EBs be configured to parse the B-VID field of packets it receives and then forward packets having a B-DA which is a broadcast address to other ports of the CB associated with the B-VID.

In another situation, EB 410 may forward a packet received from provider network 402 to more than one EB when the received packet has a C-DA that is a reserved Ethernet multicast address. In this case, EB 410 may create a duplicate for each of the other EBs to which it is connected, modify the duplicates, and forward the duplicates to the other EBs.

Alternatively, EB 410 may consult a multicast membership table that specifies which of the other EBs belongs to a membership group associated with the particular reserved multicast destination address specified by the C-DA. After consulting the multicast membership table, EB 410 may determine that a subset of the other EBs is associated with the multicast group. EB 410 may then create duplicates for the subset of EBs, modify the duplicates, and forward the modified duplicates to the subset of EBs.

Alternatively, EB 410 may receive an Ethernet packet from provider network 402 that has a C-DA specifying a MAC address that is not contained within the forwarding database of EB 410. In this case, since EB 410 does not know which EB it should send to the received packet to, EB 410 duplicates the received packet, modifies the duplicates, and forwards the modified duplicates to each of the other EBs. In this manner, EB 410 floods the received packet having an unknown MAC address specified by the C-DA to the other EBs.

According to another aspect of the invention, a packet switch receives an Ethernet packet from a packet tunnel that terminates on the packet switch. The packet tunnel is configured to relay Ethernet packets in a connection-oriented manner from one endpoint of the packet tunnel to another endpoint of the packet tunnel without altering the relayed Ethernet packets.

The received Ethernet packet includes an I-SID. The packet switch prevents the received Ethernet packet from being forwarded to another packet tunnel associated with the I-SID that originates on the packet switch.

The packet switch may also forward the received Ethernet packet to an Ethernet provider network connected to the packet switch, but only if the Ethernet provider network includes an S-VLAN associated with the I-SID. The packet switch may also modify the received Ethernet packet prior to forwarding the received Ethernet packet to the Ethernet provider network.

The modification may include removing at least the I-SID and a packet tunnel identifier associated with the packet tunnel from the received Ethernet packet. The received Ethernet packet may include an Ethernet C-DA that is an Ethernet broadcast address, Ethernet multicast address or Ethernet unicast address.

For example, the packet switch may be EB 412 of FIG. 6a described above. EB 412 may receive an Ethernet packet from a tunnel, such as packet tunnel 601. EB 412, upon receiving the Ethernet packet from packet tunnel 601, prevents the received packet from being forwarded to packet tunnel 606 or packet tunnel 609. In fact, EB 412 may restrict the Ethernet packet from being forwarded anywhere except to provider network 404.

This behavior may be advantageous in preventing broadcast storms. As was described above in relation to FIG. 1, broadcast storms may result when loops are present in an Ethernet network. Here, the packet tunnel network established by EBs 410, 412, 414, and 416 along with their associated packet tunnels could potentially create a loop.

By configuring EBs 410, 412, 414, and 416 to prevent forwarding packets they receive from a packet tunnel from being forwarded to another packet tunnel, loops, and therefore broadcast storms, may be prevented. This behavior may advantageously be used as an alternative to other broadcast storm prevention schemes such as spanning tree protocols.

EB 412, upon receiving a packet from EB 410 via packet tunnel 610, may drop the received packet instead of forwarding the received packet. Alternatively, EB 412 may forward the received packet to provider network 404 if the received packet has an I-SID value that corresponds with an S-VID value associated with provider network 404. EB 412 may consult a mapping between I-SID values and S-VID values to determine whether the received packet has an I-SID value corresponding with an S-VID value associated with provider network 404.

Figure 8:
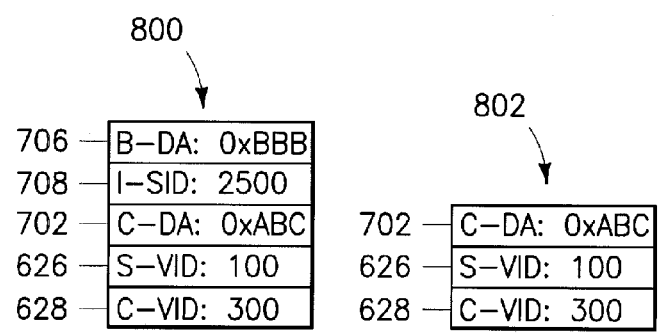
FIG. 8 illustrates other packet formats used within the system of FIG. 6*a*.

FIG. 8 illustrates exemplary packet 800 which may be received by EB 412 via a packet tunnel 601. Exemplary packet 800 includes B-DA 706, I-SID 708, C-DA 702, S-VID 626, and C-VID 628. Of course, exemplary packet 800 may include other fields as well, such as a B-VID.

EB 412 consults a mapping to determine if I-SID 708, which has a value of 2500 corresponds with an S-VID value associated with provider network 404. In this exemplary configuration, EB 412 determines that I-SID 708 having value 2500 corresponds with S-VID value 100 associated with provider network 404.

Next, EB 412 modifies exemplary packet 800 to remove at least the B-DA 712 and I-SID 708 from the packet. EB 412 then forwards the modified packet, illustrated as exemplary packet 802, to provider network 404.

In consulting the mapping between I-SID values and S-VID values, EB 412 may discover that the S-VID value of the destination provider network is different than the S-VID value of the source provider network. For example, provider network 402 may send a packet to provider network 404 having an S-VID with a value of 100. When EB 412 receives the packet, a mapping may specify that the I-SID value of the received packet corresponds with an S-VID value of 200.

Accordingly, EB 412 may modify the packet to have an S-VID value of 200 rather than 100 prior to forwarding the packet to provider network 404. EB 412 may do this despite the fact that the S-VID value of the packet received from provider network 402 may have an S-VID with a value of 100. In this manner, an S-VLAN present in provider network 402 may communicate with an S-VLAN present in provider network 404 even though the two S-VLANs have different S-VID values.

This feature may be advantageous because it may enable service providers to select S-VID values independent of other service providers. For example, if a first service provider operates provider network 402, and a second service provider operates provider network 404, it may be burdensome to require that the first service provider use the same S-VID value as the second service provider. Allowing different S-VID values to be mapped to the same I-SID may allow the first service provider to select an S-VID value independent of the S-VID value used by the second service provider.

According to another aspect of the invention, a management system receives a request to enable layer-two Ethernet communication between three more S-VLANs via three or more EBs fully connected to each other by a plurality of packet tunnels.

The management system sends one or more messages to the EBs requesting that the EBs establish the packet tunnels and a plurality of tunnel identifiers associated with the packet tunnels. The management system also sends one or more messages to the EBs requesting that the EBs modify Ethernet packets received from the S-VLANs by adding a same I-SID and one of the tunnel identifiers to the received Ethernet packets. The EBs select the one tunnel identifier on a packet-by-packet basis based on a C-DA field of the received Ethernet packets.

The management system may also determine whether the EBs have sufficient bandwidth capacity to accommodate the packet tunnels prior to requesting that the EBs establish the packet tunnels. The EBs may be indirectly connected to each other via a plurality of CBs. In this case, the management system sends one or more messages to the CBs requesting that CBs also establish the packet tunnels.

The management system may determine whether the CBs have sufficient bandwidth capacity to accommodate the packet tunnels prior to requesting that the CBs establish the packet tunnels. The management system may include a network manager and a plurality of element managers. Furthermore, the management system may send the messages out of band.

The messages may comprise Simple Network Management Protocol (SNMP) messages, configuration files, Command Line Interface (CLI) commands, eXtensible Markup Language (XML) messages, or Common Object Request Broker Architecture (CORBA) messages.

Establishing the packet tunnels may include grouping the packet tunnels into a plurality of pairs. Each pair may connect two of the EBs. For each pair, the management system may select a first EB and a second EB from among the EBs and direct the first EB to associate a port of the first EB with the first tunnel identifier. The first tunnel identifier may be one of the tunnel identifiers.

The management system may direct the second EB to associate a port of the second EB with the first tunnel identifier. Next, the management system may direct the second EB to associate a port of the second EB with a second tunnel identifier. The second tunnel identifier may be one of tunnel identifiers. The port of the second EB and the port of the first EB may be connected to each other.

The management system may direct the first EB to associate a port of the first EB with the second tunnel identifier and then direct both the first EB and the second EB to associate the first tunnel identifier with the second tunnel identifier.

The port of the second EB and the port of the first EB may be connected indirectly to each other via one or more CBs.

Figure 9:
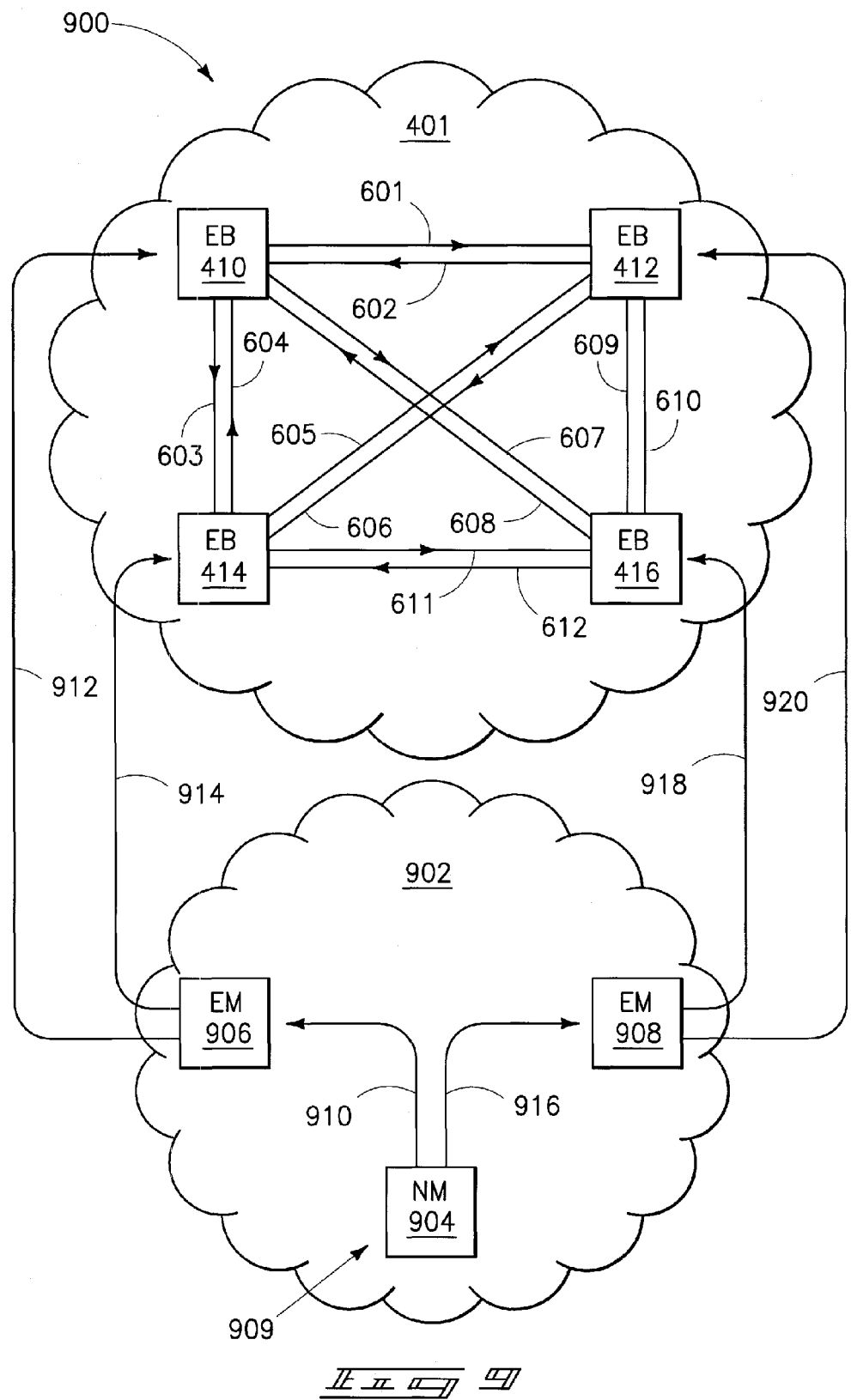
FIG. 9 illustrates a logical representation of a system comprising a packet tunnel network and a network management system.

FIG. 9 illustrates an exemplary management system 902 in accordance with this aspect of the invention. The management system includes a network manager (NM) 904 and two element managers (EMs) 906 and 908. The network manager receives a request 909 to enable layer-two Ethernet communication between S-VLANs of provider networks 402, 404, 406, and 408 (not illustrated in FIG. 9 for simplicity, but connected respectively to EBs 410, 412, 414, and 416) via backbone network 401.

NM 904 may configure backbone network 401 by sending one or more messages to EBs 410, 412, 414, and 416. For example, NM 904 may send a message 910 to EM 906 instructing EM 906 to configure EB 410 and EB 414 and may send a similar message 916 to EM 908 instructing EM 908 to configure EBs 412 and 416.

EMs 906 and 908 may configure EBs 410, 412, 414, and 416 by sending configuration instructions to the EBs. EMs 906 and 908 may send the configuration instructions via an in-band management network, an out-of-band management network or other communication network. For example, EM 906 may be directly connected to a management port of EB 410 and may be indirectly connected to EB 414 via an in-band management VLAN.

EM 906 sends messages to EBs 410 and 414 instructing EBs 410 and 414 to establish the packet tunnels that terminate or originate on EBs 410 and 414. As described above, the messages may include SNMP messages, configuration files, CLI commands, XML messages, CORBA messages, or other configuration messages.

For example, EM 906 may instruct EB 410 to establish packet tunnels 601, 602, 603, 604, 607, and 608. EM 906 might not instruct EB 410 to establish packet tunnels 605, 606, 609, or 610 since these packet tunnels neither originate nor terminate on EB 410. The instructions may include a set of tunnel identifiers that EB 410 is to associate with each of the tunnels that it creates. Alternatively, EM 906 may instruct EB 410 to select the tunnel identifiers. Of course, some management systems may not include EMs. In this case, an NM, such as NM 904, may send the instructions directly to EB 410.

EM 906 may also send a message to EB 410 providing EB 410 with a mapping between I-SID values and S-VID values used by provider network 402. EB 410 may subsequently use the mapping when processing packets received from packet tunnels 602, 604, and 608 and when processing packets received from provider network 402. EM 906 may send similar instructions to EB 414 and EM 908 may send similar instructions to EBs 412 and 416.

Once EBs 410, 412, 414, and 416 have received configuration messages and have performed instructions provided by the messages, packet tunnels 601, 602, 603, 604, 605, 606, 607, 608, 609, 610, 611, and 612 may be established. EBs 410, 412, 414, and 416 may then begin sending and receiving packets to each other via the established tunnels. In addition, each EB may begin to receive packets from one of provider networks 402, 404, 406, and 408, modify the received packets and send them to another of provider networks 402, 404, 406, and 408 via one of the packet tunnels and one of the other EBs.

Figure 10:
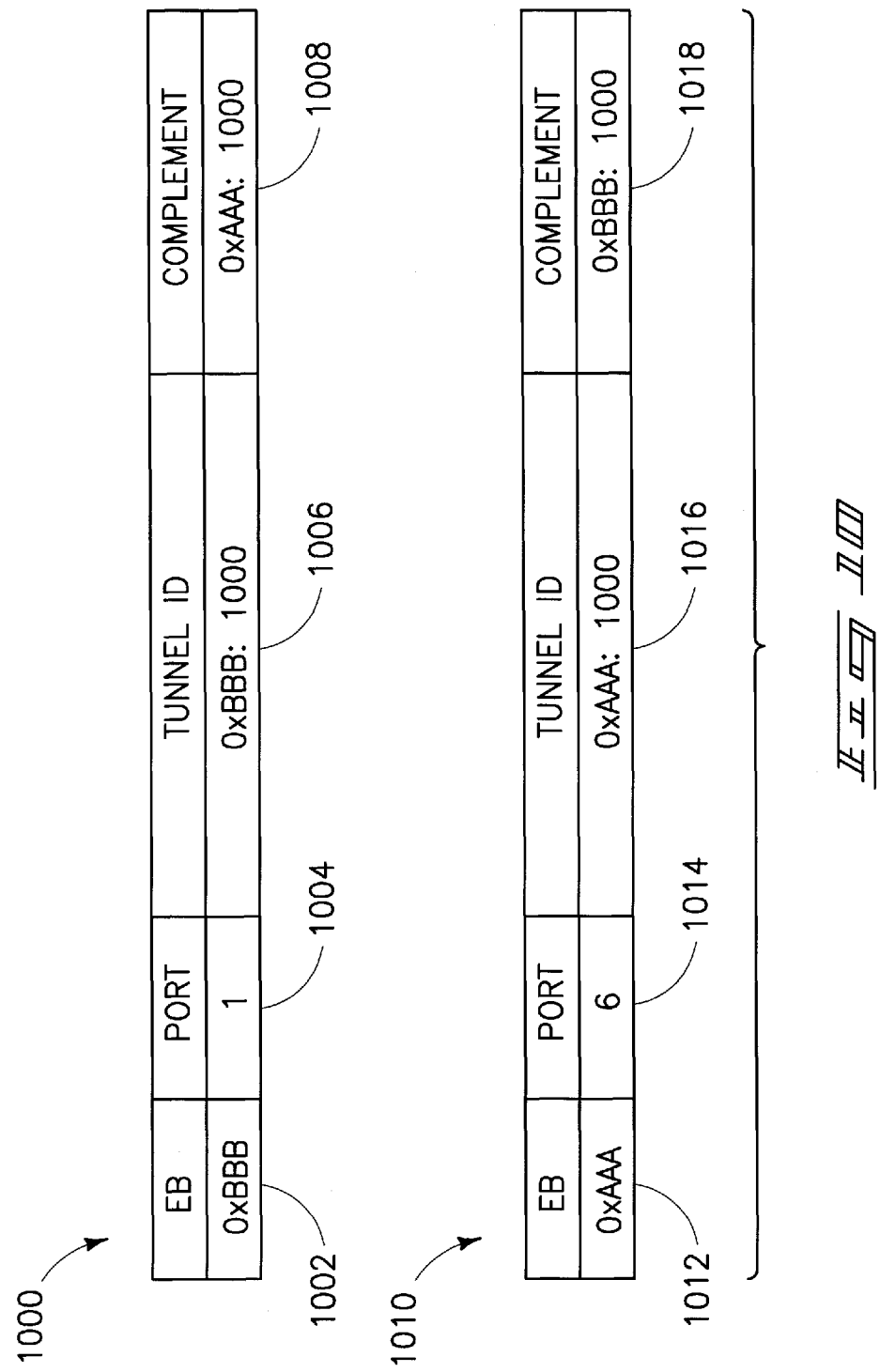
FIG. 10 illustrates exemplary configurations used by edge bridges of the packet tunnel network of FIG. 9.

FIG. 10 illustrates sample configurations 1000 and 1010. Configuration 1000 may be present on EB 410 as a result of messages sent from EM 906 to EB 410. Configuration 1000 represents packet tunnel 601 as configured on EB 410. Configuration 1000 includes the MAC address 1002 of EB 412; the number of a port 1004 of EB 410 on which packet tunnel 601 is active and which is connected, directly or indirectly, to EB 412; and a tunnel identifier 1006 for packet tunnel 601, which may include the MAC address of EB 412 as well as a B-VID. Configuration 1000 may also include a tunnel identifier 1008 of complementary packet tunnel 602, which relays packets between the same EBs as packet tunnel 601, but in the opposite direction.

Similarly, configuration 1010 may be present on EB 412 as a result of messages sent from EM 908 to EB 412. Configuration 1010 represents packet tunnel 602 as configured on EB 412. Configuration 1010 includes the MAC address 1012 of EB 410; the number of a port 1014 of EB 412 on which packet tunnel 602 is active and which is connected, directly or indirectly, to EB 410; and a tunnel identifier 1016 for packet tunnel 602, which may include the MAC address of EB 410 as well as a B-VID. Configuration 1010 may also include a tunnel identifier 1018 of complementary packet tunnel 601, which relays packets between the same EBs as packet tunnel 602, but in the opposite direction.

According to another aspect of the invention, a packet tunnel network configuration method includes receiving a request to enable layer-two communication between three or more S-VLANs via three or more EBs that are fully connected to each other by plurality of packet tunnels. The method also includes directing the EBs to establish packet tunnels and a plurality of tunnel identifiers associated with packet tunnels.

The method further includes directing the EBs to modify Ethernet packets received from the S-VLANs by adding a same I-SID and one of the tunnel identifiers to the received Ethernet packets. The EBs select the tunnel identifier on a packet-by-packet basis based on a C-DA field of the received Ethernet packets.

Each EB may have an Internet protocol (IP) interface. The request to enable layer-two Ethernet communication may be received by the IP interface of one of the EBs. Directing the EBs may include sending in-band dynamic control plane messages to the IP interfaces of the EBs.

The method may also include establishing one or more IP routes from one EB to the other EBs via one or more protocol messages such as Open Shortest Path First (OSPF) messages, Intermediate System to Intermediate System (IS-IS) messages, or Border Gateway Protocol (BGP) messages.

The dynamic control plane messages may include one or more of Resource Reservation Protocol Traffic Engineering (RSVP-TE) messages, Label Distribution Protocol (LDP) messages, Generalized Multiprotocol Label Switching (GMPLS) messages, or Multiple Virtual Local Area Network Registration Protocol (MVRP) messages.

The method may also include sending traffic engineering messages from the one EB to the other EBs. The traffic engineering messages may specify amounts of bandwidth required by the packet tunnels. The traffic engineering messages made be one or more of RSVP-TE messages, LDP messages, or GMPLS messages.

The method may also include directing the EB used to create maintenance points for the packet tunnels on the EBs. The maintenance points may be configured to send, receive, or send and receive maintenance messages. The maintenance messages may be continuity check messages compliant with the IEEE 802.1ag standard.

The EBs may be indirectly connected to each other via a plurality of CBs. In this situation, the method may include directing the CBs to establish the packet tunnels in addition to directing the EBs to establish the packet tunnels.

The method may also include directing the EBs to establish a least one backup packet tunnel between two of the EBs. The backup tunnel may be associated with one of the packet tunnels.

The method may be particularly advantageous when the number of EBs, and therefore the number of packet tunnels, is large because the method may reduce the amount of time a service provider spends configuring the packet tunnel network.

Figure 11:
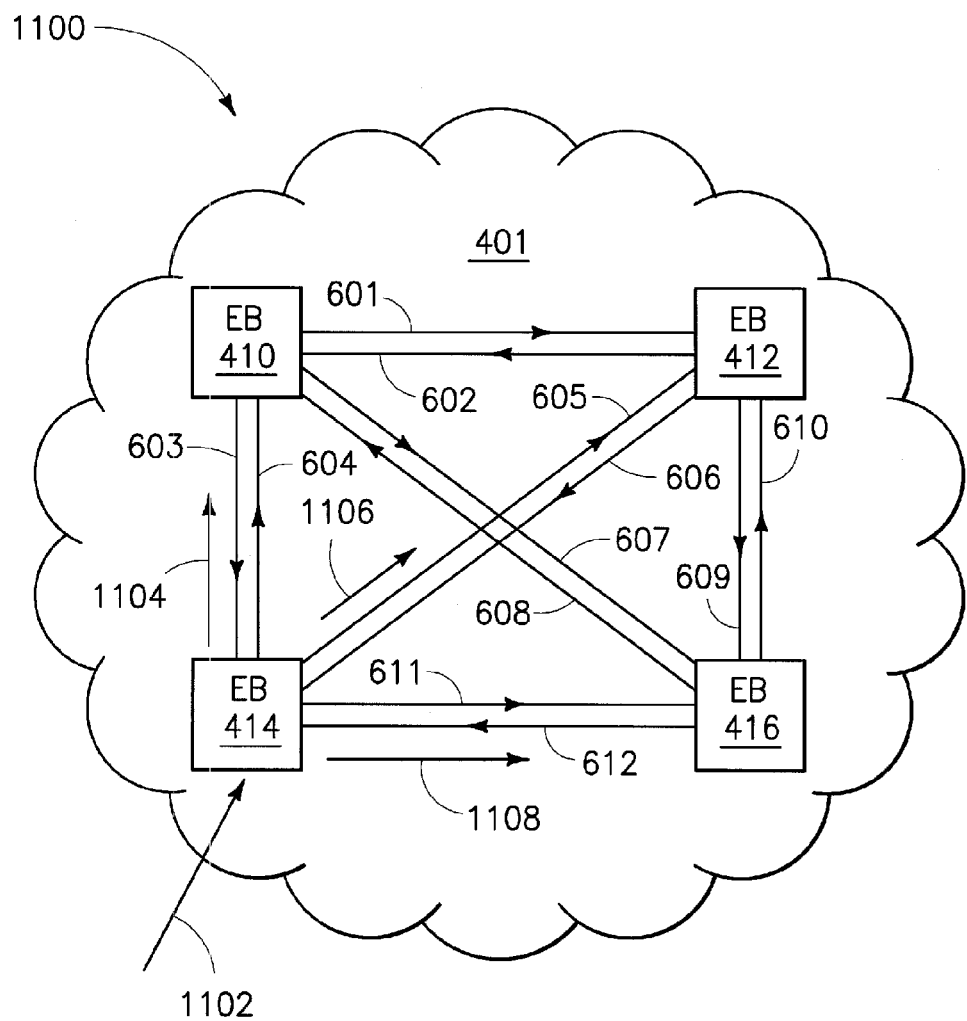
FIG. 11 illustrates a logical representation of a system comprising a packet tunnel network and a dynamic control plane.

FIG. 11 illustrates a system 1100 configured to implement the packet tunnel network configuration method described above. EB 414 receives a request 1102 to enable layer-two communication between provider networks 402, 404, 406, and 408 (not illustrated for simplicity) which are connected respectively to EBs 412, 414, 416, and 418.

EB 414 sends one or more messages 1104 to EB 410, one or more messages 1106 to EB 412, and one or more messages 1108 to EB 416. EBs 410, 412, and 416 may respond to the messages. EB 414 may use the responses to establish IP routes from EB 414 to each of the other EBs.

Once EB 414 has established IP routes, EB 414 may send dynamic control plane messages to the other EBs instructing the other EBs to configure packet tunnels 601, 602, 603, 604, 605, 606, 607, 608, 609, 610, 611, and 612. The dynamic control messages may be one or more of RSVP-TE messages, LDP messages, GMPLS messages, MVRP messages, extensions to these message types, or other messages capable of instructing the EBs to establish the packet tunnels.

EB 414 may also send a dynamic control plane message to itself in order to ensure that packet tunnels 603, 604, 605, 606, 611, and 612 are configured on EB 414.

The EBs, upon receiving the dynamic control plane messages, may configure the packet tunnels on particular ports and with particular tunnel identifiers. The EBs may select the tunnel identifiers rather than being supplied with the tunnel identifiers. For example, the EBs may select the tunnel identifiers from a range of tunnel identifiers known to be unused by the EBs. Alternatively, EB 414 may supply EBs 410, 412, and 416 with the tunnel identifiers. The EBs may use the IP routes established by EB 414 to determine ports on which each packet tunnel should be configured.

The dynamic control plane messages may also instruct the EBs regarding amounts of bandwidth that the EBs are to allocate for the packet tunnels. The amounts of bandwidth may include a maximum committed bit rate and/or may include a maximum excess bit rate. Each packet tunnel may be allocated the same amount of bandwidth. Alternatively, some packet tunnels may be allocated different amounts of bandwidth.

The dynamic control plane messages may also provide an I-SID to S-VID mapping to the EBs. Each EB may receive the same I-SID to S-VID mapping. For example, if the same S-VID values are used in each of provider networks 402, 404, 406, and 408, the EBs may utilize a single I-SID to S-VID mapping. Alternatively, the I-SID to S-VID mapping may be unique for each EB.

For example, provider networks 402, 404, 406, and 408 may each support a different set of active S-VID values. Consequently, EBs 410, 412, 414, and 416 may each have a different I-SID to S-VID mapping. The I-SID to S-VID mappings may be conveyed using MVRP messages, MVRP extension messages, or other dynamic control plane messages capable of conveying an I-SID to S-VID mapping.

The dynamic control plane messages may provide other configuration instructions to the EBs. For example, dynamic control plane messages may be sent to EBs 410, 412, 414, and 416 instructing the EBs to establish maintenance points capable of monitoring one or more of the packet tunnels.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A packet switch operating method comprising:
a packet switch receiving an Ethernet packet from an Ethernet provider network;
the packet switch creating a plurality of duplicates of the received Ethernet packet;
the packet switch modifying the duplicates by adding a same service instance identifier and a different one of a plurality of packet tunnel identifiers to each of the duplicates so that the packet tunnel identifiers comprised by the modified duplicates are different relative to one another, each of the packet tunnel identifiers being associated with and defining a different one of a plurality of packet tunnels originating on the packet switch; and
the packet switch forwarding the modified duplicates to the packet tunnels associated with the packet tunnel identifiers comprised by the modified duplicates;
wherein each of the packet tunnel identifiers of the plurality comprises a different unicast Ethernet backbone destination address relative to one another and each of the packet tunnel identifiers of the plurality comprises a backbone tag;
wherein each of the plurality of packet tunnels comprises a single tunnel having only two endpoints comprising the packet switch and another packet switch of a plurality of packet switches such that the packet switch is fully connected to each of the plurality of packet switches via the plurality of packet tunnels, and wherein each of the plurality of packet switches further connects to a plurality of Ethernet provider networks; and
wherein the packet switch is configured to prevent forwarding of packets received from one packet tunnel defined by the plurality of packet tunnel identifiers between other packet tunnels defined by the plurality of packet tunnel identifiers to prevent broadcast storms without relying on spanning tree protocols.

2. The method of claim 1 wherein the received Ethernet packet includes an Ethernet customer destination address not present in a forwarding database of the packet switch.

3. The method of claim 1 wherein the received Ethernet packet includes an Ethernet customer destination address that is an Ethernet broadcast address.

4. The method of claim 1 wherein:
the received Ethernet packet includes an Ethernet customer destination address that is an Ethernet multicast address.

5. The method of claim 1 wherein each packet tunnel has only two endpoints, one of the endpoints being associated with the packet switch, and the packet tunnels are configured to relay Ethernet packets in only one direction in a connection-oriented manner without altering the relayed Ethernet packets.

6. The method of claim 5 wherein the packet switch is an edge bridge and the other endpoint of each of the packet tunnels is associated with a different one of a plurality of edge bridges.

7. The method of claim 1 wherein a quantity of the plurality of duplicates is the same as a quantity of the plurality of packet tunnels originating on the packet switch.

8. The method of claim 1 wherein a quantity of the plurality of duplicates is less than a quantity of the plurality of packet tunnels originating on the packet switch.

9. A packet switch configured to implement the method of claim 1.

10. The method of claim 1 further comprising:
at an intermediate packet switch on one of the packet tunnels, receiving the modified duplicates and relaying the modified duplicates without altering the modified duplicates or learning a Media Access Control address of the modified duplicates.

11. The method of claim 10 wherein the intermediate packet switch is not configured to parse all fields of packets compliant to IEEE 802.1 ah.

12. The method of claim 1 wherein the Ethernet provider network comprises a provider bridging network operating according to IEEE 802.1 ad.

13. The method of claim 1 wherein the modified duplicates are forwarded based upon a customer destination address.

14. The method of claim 13 wherein the modified duplicates comprise a service VLAN Identifier (S-VID) different from the customer destination address.

15. The method of claim 14 further comprising:
forwarding the modified duplicates to two different tunnels of the packet tunnels based on the S-VID and the customer destination address.

16. The method of claim 1 wherein the plurality of packet tunnels originating on the packet switch are each communicatively coupled to another packet switch coupled to the Ethernet provider network or to another Ethernet provider network.

17. The method of claim 1 wherein the plurality of packet tunnels comprise connection-oriented connections from the packet switch to another packet switch.

18. The method of claim 1 wherein the plurality of packet tunnel identifiers defining the one packet tunnel from the other packet tunnels comprises a combination of backbone destination address (B-DA) and backbone virtual local network identifier (B-VID).

19. A packet switch operating method comprising:
a packet switch receiving an Ethernet packet from an Ethernet provider network;
the packet switch creating a plurality of duplicates of the received Ethernet packet;
the packet switch modifying the duplicates by adding a same service instance identifier and a different one of a plurality of packet tunnel identifiers to each of the duplicates so that the packet tunnel identifiers comprised by the modified duplicates are different relative to one another, each of the packet tunnel identifiers being associated with and defining a different one of a plurality of packet tunnels originating on the packet switch; and the packet switch forwarding the modified duplicates to the packet tunnels associated with the packet tunnel identifiers comprised by the modified duplicates, wherein the packet switch is configured to prevent forwarding of packets received from one packet tunnel defined by the plurality of packet tunnel identifiers between other packet tunnels defined by the plurality of packet tunnel identifiers to prevent broadcast storms without relying on spanning tree protocols.

20. The method of claim 19 wherein the plurality of packet tunnel identifiers defining the one packet tunnel from the other packet tunnels comprises a combination of backbone destination address (B-DA) and backbone virtual local network identifier (B-VID).

\* \* \* \* \*